United States Patent
Ishihara

(10) Patent No.: US 9,560,270 B2
(45) Date of Patent: Jan. 31, 2017

(54) MOVING IMAGE GENERATING APPARATUS, MOVING IMAGE GENERATING METHOD, AND STORAGE MEDIUM

(71) Applicant: CASIO COMPUTER CO., LTD., Shibuya-ku, Tokyo (JP)

(72) Inventor: Masanori Ishihara, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 113 days.

(21) Appl. No.: 14/301,019

(22) Filed: Jun. 10, 2014

(65) Prior Publication Data
US 2015/0002691 A1 Jan. 1, 2015

(30) Foreign Application Priority Data
Jun. 26, 2013 (JP) ................. 2013-133833

(51) Int. Cl.
*H04N 5/228* (2006.01)
*H04N 5/235* (2006.01)
(Continued)

(52) U.S. Cl.
CPC ........ *H04N 5/23229* (2013.01); *H04N 1/2133* (2013.01); *H04N 5/2356* (2013.01); *H04N 5/2625* (2013.01)

(58) Field of Classification Search
CPC H04N 5/23229; H04N 5/2356; H04N 5/2625; H04N 1/2133; H04N 1/21; H04N 5/235
(Continued)

(56) References Cited

U.S. PATENT DOCUMENTS

| 2004/0136689 A1 | 7/2004 | Oka | |
|---|---|---|---|
| 2008/0088710 A1* | 4/2008 | Iwamoto | H04N 1/32128 348/220.1 |

(Continued)

FOREIGN PATENT DOCUMENTS

| JP | 2002135724 A | 5/2002 |
|---|---|---|
| JP | 2002218309 A | 8/2002 |

(Continued)

OTHER PUBLICATIONS

Japanese Office Action dated Apr. 15, 2015 issued in counterpart Japanese Application No. 2013-133833.
(Continued)

*Primary Examiner* — Sinh Tran
*Assistant Examiner* — Selam Gebriel
(74) *Attorney, Agent, or Firm* — Holtz, Holtz & Volek PC

(57) ABSTRACT

In the present invention, in interval photographing, a CPU performs still image photographing based on a capture interval and a capture length set for each scene in advance. Then, for each captured still image, the CPU calculates a difference between images, writes a judgment flag indicating whether the difference is exceeding a capture threshold in EXIF information, and stores all captured images. When the interval photographing is ended, the CPU reads out the captured images, performs time-lapse moving image generation processing by using images having a positive judgment flag in the EXIF information, and stores the result.

10 Claims, 5 Drawing Sheets

30

| | SCENE | CAPTURE INTERVAL | CAPTURE LENGTH | CAPTURE THRESHOLD |
|---|---|---|---|---|
| 1 | STANDARD | 1(S) | 5 MINUTES | 10% |
| 2 | CLOUDY | 2(S) | 30 MINUTES | 20% |
| 3 | NIGHTSCAPE | 5(S) | 10 MINUTES | 10% |
| 4 | TWILIGHT | 3(S) | 30 MINUTES | 50% |
| 5 | STREETSCAPE | 1(S) | 10 MINUTES | 5% |

(51) Int. Cl.
  *H04N 5/232* (2006.01)
  *H04N 1/21* (2006.01)
  *H04N 5/262* (2006.01)

(58) Field of Classification Search
  USPC .......................................... 348/218.1, 220.1
  See application file for complete search history.

(56) References Cited

U.S. PATENT DOCUMENTS

2010/0060752 A1   3/2010  Tokuyama
2011/0080424 A1*  4/2011  Peters et al. .................. 345/620
2012/0133791 A1   5/2012  Tokuyama

FOREIGN PATENT DOCUMENTS

| JP | 2005260324 A | 9/2005 |
| JP | 2007150993 A | 6/2007 |
| JP | 2009135762 A | 6/2009 |
| JP | 2010016599 A | 1/2010 |

OTHER PUBLICATIONS

Extended European Search Report (EESR) dated Oct. 13, 2014 issued in counterpart European Application No. 14172761.0.

* cited by examiner

FIG. 2

| | SCENE | CAPTURE INTERVAL | CAPTURE LENGTH | CAPTURE THRESHOLD |
|---|---|---|---|---|
| 1 | STANDARD | 1(S) | 5 MINUTES | 10% |
| 2 | CLOUDY | 2(S) | 30 MINUTES | 20% |
| 3 | NIGHTSCAPE | 5(S) | 10 MINUTES | 10% |
| 4 | TWILIGHT | 3(S) | 30 MINUTES | 50% |
| 5 | STREETSCAPE | 1(S) | 10 MINUTES | 5% |

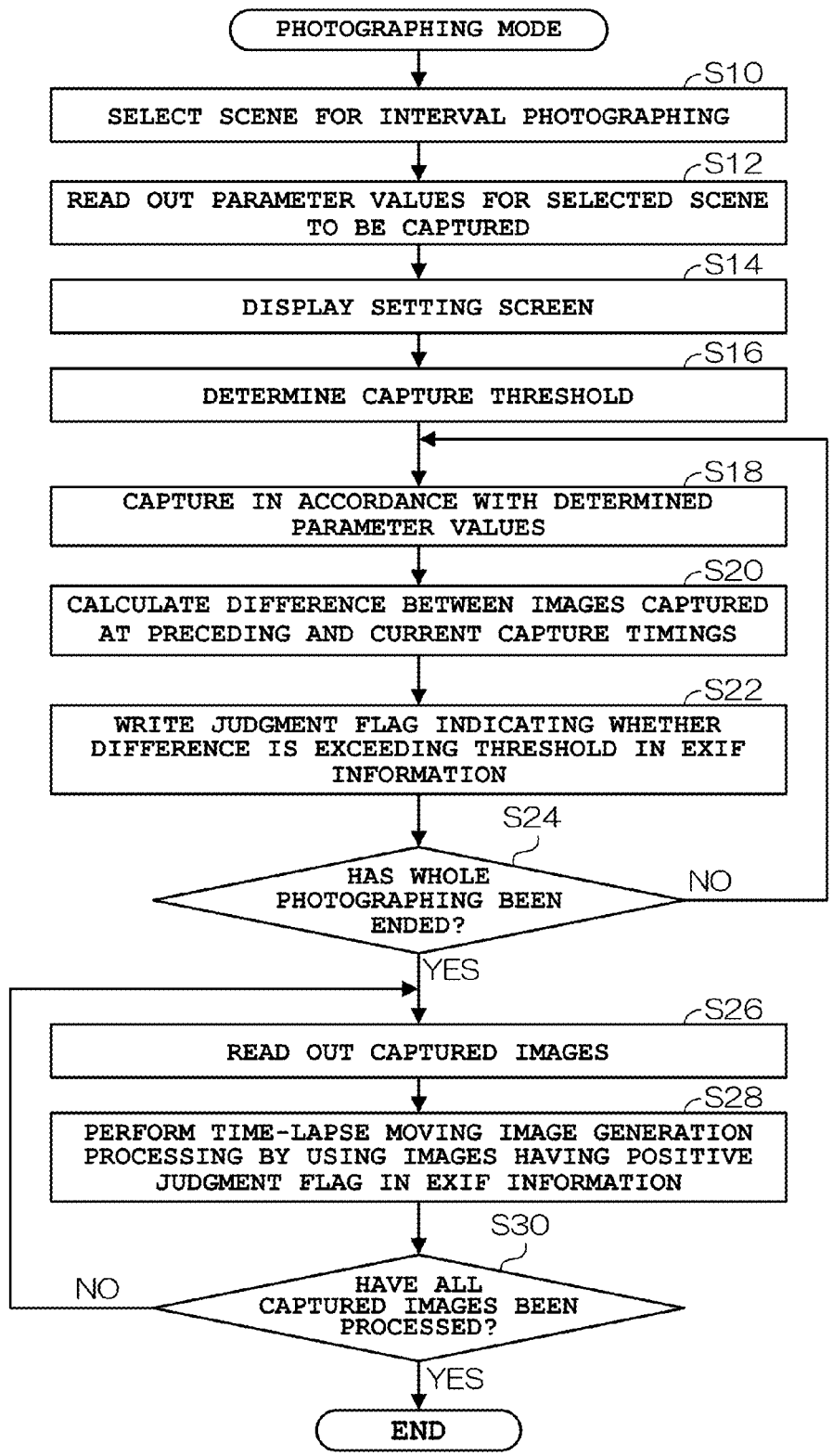

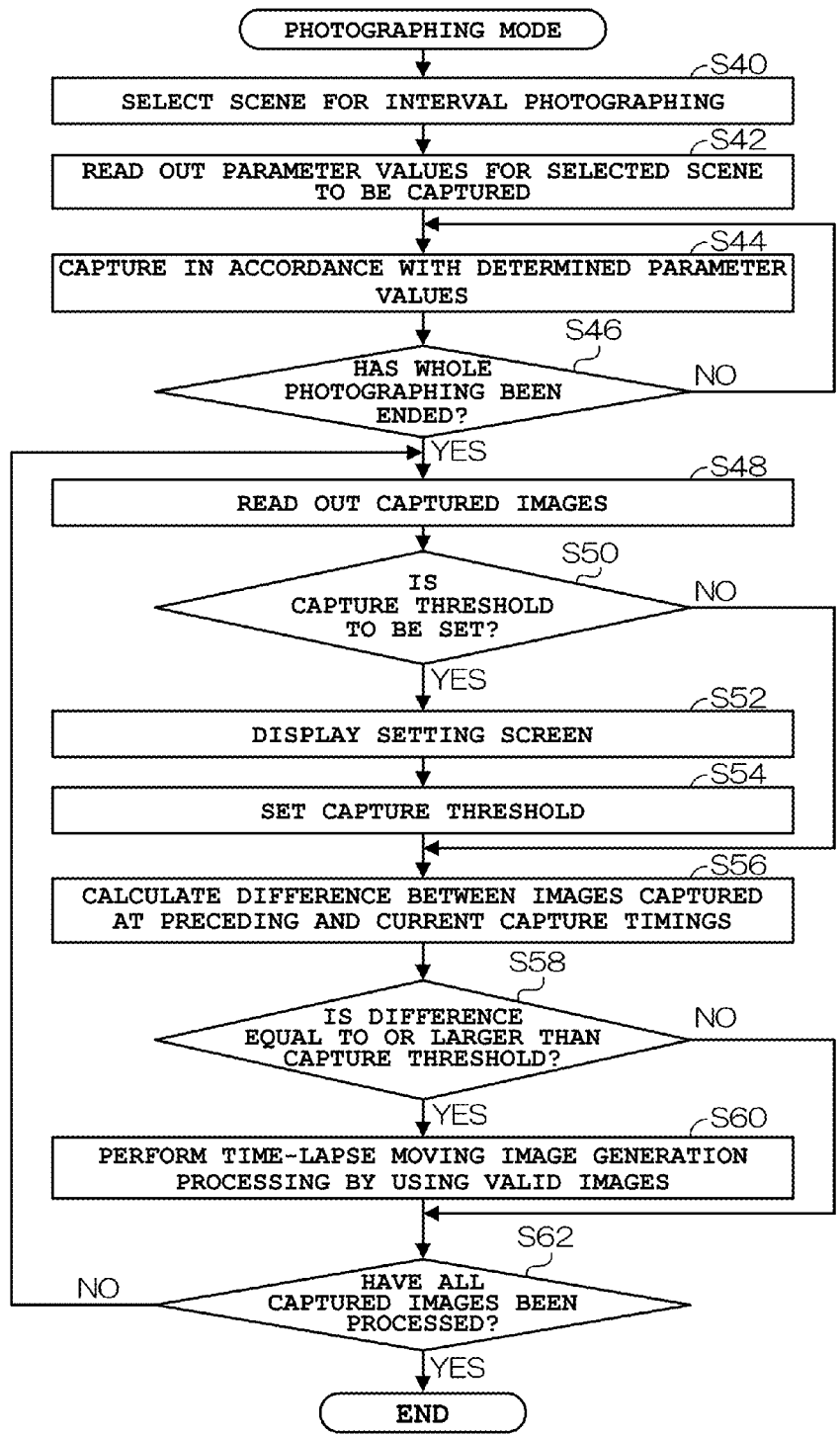

MOVING IMAGE GENERATING APPARATUS, MOVING IMAGE GENERATING METHOD, AND STORAGE MEDIUM

CROSS-REFERENCE TO RELATED APPLICATION

This application is based upon and claims the benefit of priority from the prior Japanese Patent Application No. 2013-133833, filed Jun. 26, 2013, the entire contents of which are incorporated herein by reference.

BACKGROUND OF THE INVENTION

1. Field of the Invention

The present invention relates to a moving image generating apparatus, a moving image generating method, and a storage medium.

2. Description of the Related Art

Conventionally, there is a technology for interval photographing for capturing images at predetermined time intervals, in which the importance level of a photographed subject and a change in difference are detected to dynamically change the capture intervals, as described in Japanese Patent Application Laid-Open (Kokai) Publication Nos. 2002-218309 and 2007-150993.

An object of the present invention is to provide a moving image generating apparatus, a moving image generating method, and a program capable of easily generating a moving image allowing subtle changes among captured images to be effectively enjoyed in accordance with the photographing environment and purpose.

SUMMARY OF THE INVENTION

In accordance with one aspect of the present invention, there is provided a moving image generating apparatus comprising: a control section which controls to output periodically-captured images; and a generating section which generates a moving image by using, among a plurality of images outputted under control of the control section, temporally-adjacent images where a degree of change therebetween is equal to or more than a preset degree as frames.

In accordance with another aspect of the present invention, there is provided a moving image generating method comprising: a control step of controlling to output periodically-captured images; and a generating step of generating a moving image by using, among a plurality of images outputted under control of the control step, temporally-adjacent images where a degree of change therebetween is equal to or more than a preset degree as frames.

In accordance with another aspect of the present invention, there is provided a non-transitory computer-readable storage medium having stored thereon a program that is executable by a computer in a moving image generating apparatus that generates moving images, the program being executable by the computer to perform functions comprising: control processing for controlling to output periodically-captured images; and generation processing for generating a moving image by using, among a plurality of images outputted under control of the control processing, temporally-adjacent images where a degree of change therebetween is equal to or more than a preset degree as frames.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a conceptual diagram depicting the data structure of a parameter table 30 having stored therein photographing conditions for each scene in interval photographing by the imaging apparatus 1 according to the first embodiment;

FIG. 4 is a flowchart for describing the operation of the imaging apparatus 1 according to the first embodiment in interval photographing; and FIG. 5 is a flowchart for describing the operation of the imaging apparatus 1 according to a second embodiment in interval photographing.

DETAILED DESCRIPTION OF THE PREFERRED EMBODIMENTS

Hereafter, embodiments of the present invention are described with reference to the drawings.

A. First Embodiment

A-1. Structure of First Embodiment

Figure 1:
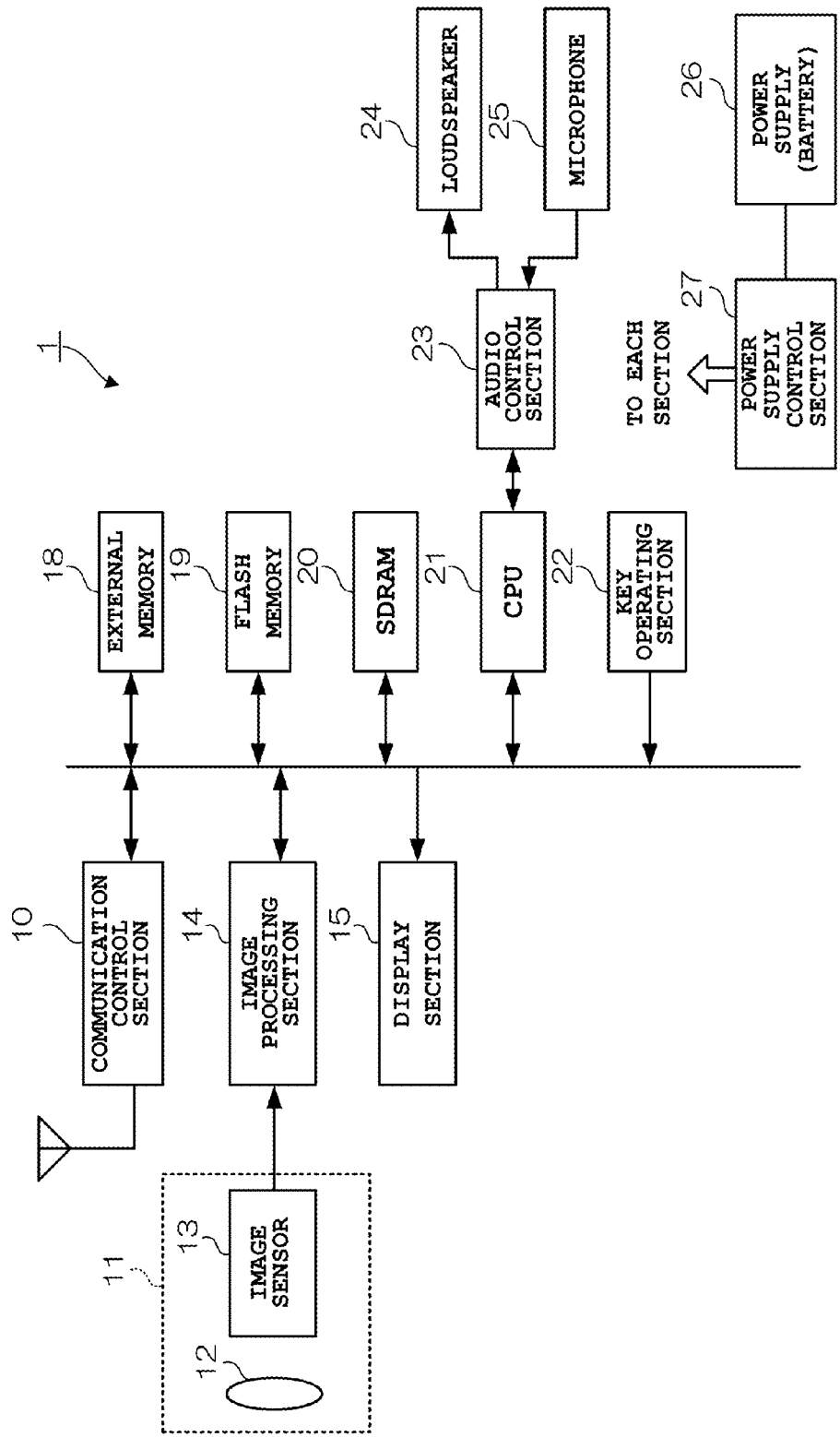
FIG. 1 is a block diagram depicting the structure of an imaging apparatus 1 according to a first embodiment of the present invention.

FIG. 1 is a block diagram depicting the structure of an imaging apparatus 1 according to a first embodiment of the present invention. In FIG. 1, the imaging apparatus 1 includes a communication control section 10, an imaging section 11, an image processing section 14, a display section 15, an external memory 18, a flash memory 19, a SDRAM (Synchronous Dynamic Random Access Memory) 20, a CPU (Central Processing Unit) 21, a key operating section 22, an audio control section 23, a loudspeaker 24, a microphone 25, a power supply (battery) 26, and a power supply control section 27.

The communication control section 10 transfers captured image data (still images or moving images) to a server on the Internet, or to an information processing device such as a personal computer via the Internet, etc. This communication control section 10 can also transfer a live view image or images being recorded to an external replay/display apparatus via peer-to-peer communications. The imaging section 11 includes a lens block 12 constituted by an optical lens group and an image sensor 13 such as a CCD (Charge Coupled Device) or CMOS (Complementary Metal-Oxide Semiconductor).

The image sensor 13 converts an image entering from the lens block 12 to a digital signal. The image processing section 14 performs image processing (such as pixel interpolation processing, γ correction, luminance color-difference signal generation, white balance processing, and exposure correction processing) and compression and expansion of image data (for example, compression and expansion of a JPEG (Joint Photographic Experts Group) format, Motion-JPEG format, or MPEG (Moving Picture Experts Group) format). The display section 15 includes a liquid-crystal display device or an organic EL (Electro Luminescence)

display device, and displays various menu screens, a live view screen at the time of imaging, and a replay screen for captured image data, etc.

The external memory 18 is a removable storage medium, and stores image data captured by the imaging section 11 and the like. The flash memory 19 is a storage medium for storing image data captured by the imaging section 11 and the like. The SDRAM 20 is used as a buffer memory for temporarily storing image data captured by the imaging section 11 and then sent to the CPU 21, and is also used as a working memory for the CPU 21.

The CPU 21, which is a one-chip microcomputer for controlling each section of the imaging apparatus 1, causes the imaging section 11 to perform still image photographing, starts and stops moving image recording, switches between still-image photographing and moving image capturing, or the like. In particular, when performing interval photographing, the CPU 21 of the first embodiment performs still image photographing based on a capture interval and a capture length set for each scene in advance. Then, for each captured still image, the CPU 21 records a capture threshold (a difference between an image captured at current capture timing and an image captured at the preceding capture timing; hereinafter referred to as "inter-frame difference") set in advance for the scene, and causes all of the captured images to be stored. When the interval photographing is ended, the CPU 21 extracts a plurality of images from the captured images based on their capture thresholds, and generates a moving image (hereinafter referred to as "time-lapse moving image") by using these images obtained by the interval photographing as frames.

More specifically, in interval photographing, the CPU 21 of the first embodiment calculates a difference between captured images, writes a judgment flag indicating whether the difference is exceeding a capture threshold in EXIF information, and causes all captured images to be stored. Then, when the interval photographing is ended, the CPU 21 reads out the captured images, performs time-lapse moving image generation processing by using images having a positive judgment flag in the EXIF information, and causes the result to be stored. As a result of this configuration, a capture threshold regarding an inter-frame change amount can be set for each capture scene, and a time-lapse moving image can be generated by which time-compressed subtle changes of a photographed scene in a plurality of images captured by interval photographing performed over a long period of time can be efficiently enjoyed.

The key operating section 22 inputs an operation mode or an operation instruction such as start capturing, pause, or stop in response to a user operation. The audio control section 23 converts audio (such as alarm sound) at the time of moving image replay to an analog signal and outputs it from the loudspeaker 24. Also, the audio control section 23 digitalizes and captures environmental sounds collected by the microphone 25 at the time of moving image capturing. The power supply (battery) 26 is a rechargeable secondary battery. The power supply control section 27 stabilizes the output voltage of the power supply (battery) 26, and supplies drive electric power to each section.

FIG. 2 is a conceptual diagram depicting the data structure of a parameter table 30 including photographing conditions for each photographing environment (scene) desired to be replayed as the above-mentioned time-lapse moving image in the first embodiment. The imaging apparatus 1 has this parameter table 30 for each scene in interval photographing, in the SDRAM 20 or the like. In the parameter table 30, a capture interval, a capture length, and a capture threshold have been stored for each scene in interval photographing. Examples of scenes include standard, cloudy, nightscape, twilight, and streetscape.

In the scene "standard", the capture interval is "1 (s=second)", the capture length is "5 minutes", and the capture threshold is "10%". In the scene "cloudy", the capture interval is "2(s)", the capture length is "30 minutes", and the capture threshold is "20%". In the scene "nightscape", the capture interval is "5(s)", the capture length is "10 minutes", and the capture threshold is "10%". In the scene "twilight", the capture interval is "3(s)", the capture length is "30 minutes", and the capture threshold is "50%". In the scene "streetscape", the capture interval is "1(s)", the capture length is "10 minutes", and the capture threshold is "5%".

Note that the capture threshold herein is a threshold for selecting captured images to be used to generate a time-lapse moving image, which corresponds to a difference between images captured at temporally-consecutive capture timings, such as current capture timing and the preceding capture timing. For example, when the capture threshold is 10%, and the difference between images captured at temporally-consecutive capture timings (for example, the difference for each pixel value) is equal to or larger than 10%, these captured images are selected as frames for generating a time-lapse moving image. Also, this capture threshold can be set (changed) by a user when interval photographing is performed. As such, by time-lapse moving image generation using captured images having a relatively large capture threshold (difference between captured images), a more effective time-lapse moving image can be generated by which subtle changes among images obtained by image capturing performed over a long period of time can be enjoyed.

Figure 3:
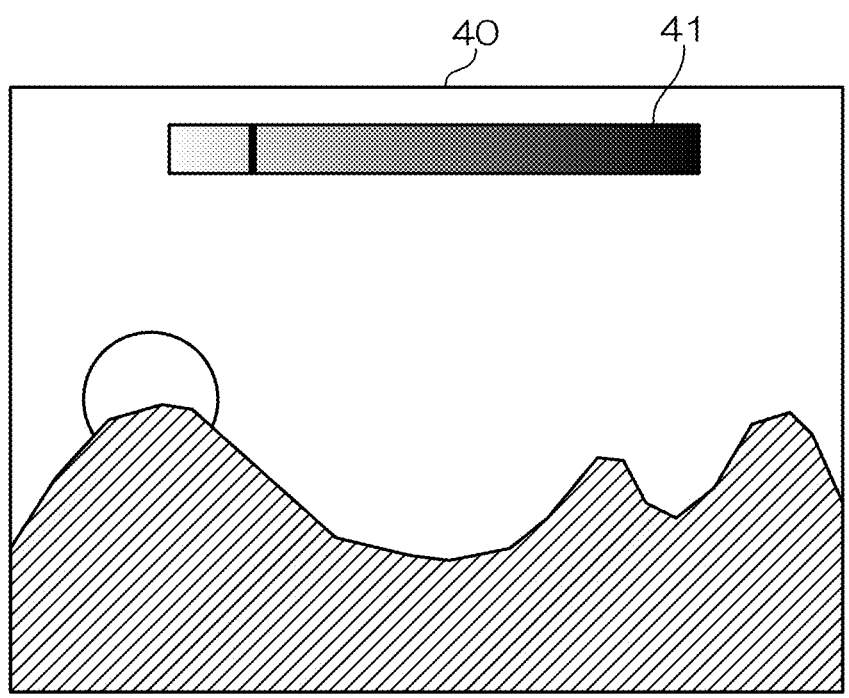
FIG. 3 is a conceptual diagram of a setting screen 40 of the imaging apparatus 1 according to the first embodiment.

FIG. 3 is a conceptual diagram depicting a setting screen 40 for setting a capture threshold in the imaging apparatus 1 according to the first embodiment. In the first embodiment when arbitrarily changing a capture threshold, the user performs a predetermined operation, so that the setting screen 40 is displayed on the display section 15 of the imaging apparatus 1, as depicted in FIG. 3. On the setting screen 40, a capture threshold setting slider 41 indicating a capture threshold is displayed by being superimposed on a captured image. By operating the capture threshold setting slider 41 indicating a capture threshold while viewing the screen, the user can set (change) the capture threshold. Note that, when nothing has been set, the default setting (the setting value in the parameter table 30) is maintained.

A-2. Operation of First Embodiment

FIG. 4 is a flowchart for describing the operation of the imaging apparatus 1 according to the first embodiment in interval photographing. First, when the user selects an interval photographing mode, the flowchart of FIG. 4 is started, and the CPU 21 of the imaging apparatus 1 prompts the user to select a scene for interval photographing (cloudy, nightscape, etc.) (Step S10). Then, when a scene for interval photographing is selected by the user, the CPU 21 reads out parameter values set for the selected scene (capture interval, capture length, and capture threshold) from the parameter table 30 (Step S12).

Next, the CPU 21 displays the setting screen 40 on the display section 15, as depicted in FIG. 4 (Step S14). Subsequently, the user sets (changes) the capture threshold while viewing the screen. In a case where nothing is set, the default setting (the setting value in the parameter table 30) is maintained. Then, the CPU 21 determines the capture threshold according to the user's operation (Step S16).

Next, the CPU 21 controls the imaging section 11, the image processing section 14, and the like, and thereby starts interval photographing in accordance with determined parameter values (capture interval and capture length) (Step S18). When an image is captured, the CPU 21 calculates a difference between an image (N) captured at the preceding capture timing and the image (N+1) captured at the current capture timing (Step S20), and then writes a judgment flag indicating whether the difference is exceeding the capture threshold in EXIF information (Step S22).

Next, the CPU 21 judges whether the whole photographing has been ended, that is, the capture length has elapsed (Step S24). When judged that the interval photographing has not been ended (NO at Step S24), the CPU 21 returns to Step S18, and continues the interval photographing. As such, in the first embodiment, in interval photographing, a difference between captured images is calculated, a judgment flag indicating whether the difference is exceeding a capture threshold is written in EXIF information, and all captured images are stored.

At Step S24, when judged that the interval photographing has been ended (YES at Step S24), the CPU 21 reads out the captured images (Step S26), refers to each judgment flag recorded in the EXIF information, selects captured images regarded as "valid", that is, captured images having a capture threshold satisfying the set value stored in the parameter table 30, and generates a time-lapse moving image using these images as frames (Step S28). Next, the CPU 21 judges whether the judgment and selection processing has been performed on all of the captured images (Step S30). When judged that not all of the captured images have been processed (NO at Step S30), the CPU 21 returns to Step S26 to repeat the above-described processing on the next captured image. As a result of this configuration, a more effective time-lapse moving image can be generated by which subtle changes among images obtained by image capturing performed over a long period of time can be enjoyed. At Step S30, when judged that all of the captured images have been processed (YES at Step S30), the processing is ended.

In the above-described first embodiment, a difference between images captured at temporally-consecutive capture timings is calculated, a judgment flag indicating whether the difference is exceeding a capture threshold is written in EXIF information, and all captured images are stored. Then, after the interval photographing is ended, the captured images are read out, and a time-lapse moving image is generated by using captured images having a positive judgment flag in the EXIF information. As a result of this configuration, a capture threshold for an inter-frame change amount can be set for each photographing environment (scene) to be replayed as a time-lapse moving image. Also, efficient time-lapse moving image generation processing can be performed.

Also, in the first embodiment, the preset degree of change between temporally-adjacent images is stored in the parameter table 30. Accordingly, captured images having moderate changes, which are suitable for generating a time-lapse moving image, can be easily extracted.

Moreover, in the first embodiment, a plurality of images having a difference exceeding a capture threshold are extracted to generate a time-lapse moving image. Therefore, a time-lapse moving image can be generated by which subtle changes among captured images can be effectively enjoyed.

B. Second Embodiment

Next, a second embodiment of the present invention is described.

B-1. Structure of Second Embodiment

The structure of the aging apparatus 1 of the second embodiment (FIG. 1), the data structure of the parameter table 30 (FIG. 2), and the setting screen 40 (FIG. 3) are similar to those of the first embodiment described above, and therefore the descriptions thereof are omitted.

In the second embodiment, in interval photographing, the CPU 21 performs still image photographing based on a capture interval and a capture length set for each scene in advance. When the interval photographing ended, the CPU 21 selects images to be extracted as a time-lapse moving image from among the captured images, in accordance with a capture threshold set in advance for the scene (inter-frame difference). Then, the CPU 21 generates a time-lapse moving image by using the selected captured images.

More specifically, in interval photographing, the CPU 21 of the second embodiment calculates a difference between images captured at temporally-consecutive capture timings, and causes all captured images to be stored without writing a judgment flag indicating whether the difference is exceeding a capture threshold in EXIF information. Then, when the interval photographing is ended, the CPU 21 reads out the captured images, calculates differences among the captured images, selects captured images to be extracted as a time-lapse moving image, and generates a time-lapse moving image from the selected captured images. As a result of this configuration, a capture threshold regarding an inter-frame change amount can be set for each scene (starry sky, nightscape, miniature, etc.), and efficient time-lapse moving image generation processing can be performed.

B-2. Operation of Second Embodiment

FIG. 5 is a flowchart for describing the operation of the imaging apparatus 1 according to the second embodiment interval photographing. First, when the user selects an interval photographing mode, the flowchart of FIG. 5 is started, and the CPU 21 of the imaging apparatus 1 prompts the user to select a scene for interval photographing (cloudy, nightscape, etc.) (Step S40). Then, when a scene for interval photographing is selected by the user, the CPU 21 reads out parameter values set for the selected scene (capture interval, capture length, and capture threshold) (Step S42).

Next, the CPU 21 controls the imaging section 11, the image processing section 14, and the like, and thereby starts interval photographing in accordance with determined parameter values (capture interval and capture length) (Step S44). Next, the CPU 21 judges whether the whole photographing has been ended, that is, the capture length has elapsed (Step S46). When judged that the interval photographing has not been ended (NO at Step S46), the CPU 21 returns to Step S44, and continues the interval photographing. As such, in the second embodiment, in interval photographing, a difference between captured images is calculated, and all captured images are stored without writing a judgment flag indicating whether the difference is exceeding a threshold in the EXIF information.

At Step S46, when judged that the interval photographing has been ended (YES at Step S46), the CPU 21 reads out the captured images (Step S48), and judges whether a capture threshold is to be set, based on a detection of a user operation (Step S50). Then, when it is detected that a capture threshold not to be set (NO at Step S50), the CPU 21 proceeds to Step S56 described below.

At Step S50, when it is detected that a capture threshold is to be set (YES at Step S50), the CPU 21 causes the setting screen 40 to be displayed on the display section 15, as depicted in FIG. 3 (Step S52). Here, the user sets (changes) the capture threshold while viewing the screen. However, when the judgment result at Step 50 is NO, the default setting (the value set in the parameter table 30) is maintained. Then, the CPU 21 determines the capture threshold in accordance with the user's operation (Step S54).

Next, the CPU 21 calculates a difference between read images captured at temporally-consecutive capture timings (Step S56), and judges whether there are captured images having a difference equal to or larger than the capture threshold (Step S58). Here, the CPU 21 does not select captured images having a difference smaller than the capture threshold (NO at Step S58), and judges whether all of the captured images have been processed (Step S62). When judged that there remain unprocessed captured images (NO at Step S62), the CPU 21 returns to Step S48 to repeat the above-described processing. That is, captured images having a difference smaller than the capture threshold are not selected as frames for generating a time-lapse moving image.

At Step S58, when there are captured images having a difference equal to or larger than the capture threshold (YES at Step S58), the CPU 21 generates a time-lapse moving image using these images as frames (Step S60). As a result of this configuration, a more effective time-lapse moving image can be generated by which subtle changes among images obtained by image capturing performed over a long period of time can be enjoyed. Then, the CPU 21 judges whether all of the captured images have been processed (Step S62). When judged that there remain unprocessed captured image (NO at Step S62), the CPU 21 returns to Step S48 and repeats the above-described processing on the unprocessed captured images. When judged that the processing has been performed on all of the captured images (YES at Step S62), the processing is ended.

In the above-described second embodiment, in interval photographing, a difference between captured images is calculated, and all captured images are stored without writing a judgment flag indicating whether the difference is exceeding a threshold in EXIF information. Then, after the interval photographing is ended, a difference between read captured images is calculated, captured images to be extracted as a time-lapse moving image are selected, and a time-lapse moving image is generated from the selected captured images. Therefore, a more effective time-lapse moving image can be generated by which subtle changes among images obtained by image capturing performed over a long period of time can be enjoyed.

Also, in the second embodiment, the preset degree of change is stored in the parameter table 30 for each scene. Therefore, captured images having moderate changes, which are suitable for generating a time-lapse moving image, can be easily extracted.

Moreover, in the second embodiment, a plurality of images having a difference exceeding a capture threshold is extracted after interval photographing so as to generate a time-lapse moving image. Therefore, captured images with small changes can be excluded, and a more effective time-lapse moving image can be generated and replayed.

While the present invention has been described with reference to the preferred embodiments, it is intended that the invention be not limited by any of the details of the description therein but includes all the embodiments which fall within the scope of the appended claims.

What is claimed is:

1. A moving image generating apparatus comprising:
   a memory which stores a plurality of degrees; and
   a processor which is configured to:
   perform control to output periodically-captured images; and
   generate a moving image by using, among a plurality of the output images, temporally-adjacent images where a degree of change therebetween is equal to or more than a degree set in advance from among the plurality of degrees stored in the memory, as frames,
   wherein the memory stores the plurality of degrees in association with a plurality of photographing conditions,
   wherein the memory stores plural sets of the plurality of degrees and the plurality of photographing conditions by associating each of the plurality of degrees with respective ones of the plurality of photographing conditions in a one-to-one relationship,
   wherein the processor is further configured to select a specific photographing condition from among the plurality of photographing conditions stored in the memory,
   wherein a degree associated with the selected photographing condition is set as the degree set in advance, and
   wherein the plurality of degrees stored in the memory respectively represent an amount of change between temporally-adjacent images to be used for generating a moving image.

2. The moving image generating apparatus according to claim 1, wherein the processor is further configured to select a specific degree from among the plurality of degrees stored in the storage section and set the specific degree.

3. The moving image generating apparatus according to claim 1, further comprising:
   an image sensor which captures an image,
   wherein the processor performs control to output the periodically-captured images from the sensor.

4. The moving image generating apparatus according to claim 1, further comprising:
   an image storage memory which stores a plurality of the periodically-captured images,
   wherein the processor performs control to sequentially output the plurality of periodically-captured images stored in the image storage memory.

5. The moving image generating apparatus according to claim 4, further comprising:
   an image sensor which captures an image,
   wherein the image storage memory stores a plurality of images periodically captured by the image sensor.

6. The moving image generating apparatus according to claim 1, wherein the processor is further configured to replay the generated moving image.

7. The moving image generating apparatus according to claim 1, wherein the periodically-captured images are images captured at predetermined intervals and recorded as still images.

8. A moving image generating method for a moving image generation apparatus comprising a memory which stores a plurality of degrees, the method comprising:

controlling to output periodically-captured images; and generating a moving image by using, among a plurality of the output images, temporally-adjacent images where a degree of change therebetween is equal to or more than a degree set in advance from among the plurality of degrees stored in the memory, as frames, wherein the memory stores the plurality of degrees in association with a plurality of photographing conditions, wherein the memory stores plural sets of the plurality of degrees and the plurality of photographing conditions by associating each of the plurality of degrees with respective ones of the plurality of photographing conditions in a one-to-one relationship, wherein a specific photographing condition is selected from among the plurality of photographing conditions stored in the memory, wherein a degree associated with the selected photographing condition is set as the degree set in advance and, wherein the plurality of degrees stored in the memory respectively represent an amount of change between temporally-adjacent images to be used for generating a moving image.

9. A non-transitory computer-readable storage medium having stored thereon a program that is executable by a computer in a moving image generating apparatus that generates moving images and that comprises a memory which stores a plurality of degrees, the program being executable by the computer to perform functions comprising:

control processing for controlling to output periodically-captured images; and generation processing for generating a moving image by using, among a plurality of the images outputted under control of the control processing, temporally-adjacent images where a degree of change therebetween is equal to or more than a degree set in advance from among the plurality of degrees stored in the memory, as frames, wherein the memory stores the plurality of degrees in association with a plurality of photographing conditions, wherein the memory stores plural sets of the plurality of degrees and the plurality of photographing conditions by associating each of the plurality of degrees with respective ones of the plurality of photographing conditions in a one-to-one relationship, wherein a specific photographing condition is selected from among the plurality of photographing conditions stored in the memory, wherein a degree associated with the selected photographing condition is set as the degree set in advance, and wherein the plurality of degrees stored in the memory respectively represent an amount of change between temporally-adjacent images to be used for generating a moving image.

10. The moving image generating apparatus according to claim 1, wherein the processor is further configured to perform control to capture images with an image sensor upon selection of the photographing condition.

* * * * *